United States Patent
Mukherjee et al.

(10) Patent No.: US 12,547,739 B2
(45) Date of Patent: Feb. 10, 2026

(54) SYSTEMS AND METHODS FOR CREATING DERIVATIVE DIGITAL ASSETS BY BRANCHING ON AN ORIGINAL NON-FUNGIBLE TOKEN

(71) Applicant: BANK OF AMERICA CORPORATION, Charlotte, NC (US)

(72) Inventors: Maharaj Mukherjee, Poughkeepsie, NY (US); George Anthony Albero, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 226 days.

(21) Appl. No.: 17/994,753

(22) Filed: Nov. 28, 2022

(65) Prior Publication Data

US 2024/0176895 A1    May 30, 2024

(51) Int. Cl.
*G06F 21/60* (2013.01)
*G06F 16/27* (2019.01)

(52) U.S. Cl.
CPC .......... *G06F 21/602* (2013.01); *G06F 16/275* (2019.01)

(58) Field of Classification Search
None
See application file for complete search history.

(56) References Cited

U.S. PATENT DOCUMENTS

| | | | |
|---|---|---|---|
| 10,795,857 B2 | 10/2020 | Lin | |
| 10,896,171 B2 | 1/2021 | Winarski | |
| 11,256,788 B2 | 2/2022 | Goldston et al. | |
| 11,562,451 B1* | 1/2023 | Kozlowski, III | ....... G06F 16/27 |
| 2016/0028552 A1 | 1/2016 | Spanos et al. | |
| 2018/0285996 A1 | 10/2018 | Ma | |
| 2019/0155997 A1 | 5/2019 | Vos et al. | |
| 2019/0318348 A1 | 10/2019 | Brenner et al. | |
| 2019/0334957 A1 | 10/2019 | Davis et al. | |
| 2020/0090143 A1 | 3/2020 | Iervolino | |
| 2020/0242105 A1 | 7/2020 | Rich et al. | |
| 2020/0272713 A1 | 8/2020 | Black | |
| 2022/0173893 A1 | 6/2022 | Basu et al. | |
| 2022/0182700 A1 | 6/2022 | Utile | |
| 2022/0210061 A1* | 6/2022 | Simu | ..................... H04L 9/3239 |
| 2022/0351195 A1 | 11/2022 | Quigley et al. | |

(Continued)

*Primary Examiner* — Oleg Korsak
*Assistant Examiner* — Shadi H Kobrosli
(74) *Attorney, Agent, or Firm* — Moore & Van Allen PLLC; Anup Iyer

(57) ABSTRACT

Creation and secure storage of non-fungible tokens (NFT) formed from derivatives of digital properties/assets within a branch of a distributed ledger that stores the original NFT. Each branch of the distributed ledger emanates from a data block of the trunk of the distributed ledger and stores an NFT formed from a derivative of the underlying digital property used to form the original NFT. Each NFT formed from the derivative of the digital property may include a smart contract that defines the parameters for the derivative and logic for determining resource compensation for the creator/owner of the original digital property/asset based on consumption of the derivative digital property/asset. Moreover, sub-branches may emanate from data blocks of the branches of the distributed ledger, with the sub-branches storing an NFT formed from a derivative of the derivative digital property/asset.

13 Claims, 9 Drawing Sheets

(56) References Cited

U.S. PATENT DOCUMENTS

| | | | |
|---|---|---|---|
| 2022/0366022 A1 | 11/2022 | Goldston et al. | |
| 2023/0070586 A1* | 3/2023 | Kapur | G06Q 20/123 |
| 2023/0075884 A1* | 3/2023 | Jakobsson | H04L 9/50 |
| 2023/0130182 A1* | 4/2023 | Mir | H04L 9/3297 |
| | | | 713/189 |
| 2023/0143854 A1* | 5/2023 | Venezia | H04L 9/3213 |
| | | | 705/65 |
| 2023/0347257 A1* | 11/2023 | Jordan | G06Q 40/04 |
| 2024/0037620 A1* | 2/2024 | Fetman | G06Q 30/0609 |
| 2024/0264996 A1* | 8/2024 | Soon-Shiong | G06F 16/27 |
| 2025/0238757 A1* | 7/2025 | Howell | G06Q 10/101 |

\* cited by examiner

SYSTEMS AND METHODS FOR CREATING DERIVATIVE DIGITAL ASSETS BY BRANCHING ON AN ORIGINAL NON-FUNGIBLE TOKEN

FIELD OF THE INVENTION

The present invention is related generally to secure storage and authentication of digital assets/properties and, more specifically, systems and methods for generating and storing non-fungible tokens (NFT) formed from derivatives of digital properties within a branch of a distributed ledger that stores the original NFT.

BACKGROUND

Non-Fungible Tokens (NFTs) are cryptographic digital assets/properties typically stored on a blockchain (i.e., distributed ledger) with unique identification codes and metadata that serves to distinguish each NFT from one another. Unlike cryptocurrencies which are identical to each other and therefore serve as a medium for commercial transactions, NFTs cannot be traded or otherwise exchanges at equivalency.

For example, NFTs can represent real-world assets/properties, such as images (e.g., artwork), multimedia (e.g., movies, other entertainment), audio (e.g., songs), and the like, as well as digital properties, such as digital real estate and the like. Tokenization of such real-world tangible properties makes for exchanging of NFTs more efficient while reducing the probability of malfeasance. In this regard, the distributed ledger serves to verify the authenticity of the NFT and provides secure storage of the NFT. In addition, the distributed ledger serves to capture all of the transactions/exchanges related to the NFT.

However, heretofore the ability to create or authorize the creation of new properties from existing NFTs (i.e., derivatives) has been limited or otherwise problematic. This is exasperated by the conventional blockchain/distributed ledger technology which typically creates a linear sequential chain of NFT related events.

Therefore, a need exists to develop systems, methods, computer program products and the like which generation and storage of NFTs formed from derivatives of digital properties. In this regard, the desired systems, methods and the like should not only provide for creation of such multiple derivatives but should also provide for the authenticity and storage of multiple derivatives to be provided for within the same distributed ledger that stores the original NFT.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for creation and secure storage of non-fungible tokens (NFT) formed from derivatives of digital properties within a branch of a distributed ledger that stores the original NFT. The concept of branching within a distributed ledger provides for creation of a so-called "branch" to be formed from any data block within an existing distributed ledger. In this regard, multiple branches may emanate from any one data block within the distributed ledger. In accordance with the present invention, each branch of the distributed ledger stores an NFT formed from a derivative of the underlying digital property used to form the original NFT stored on the so-called "trunk" of the distributed ledger. A derivative of the digital property includes any work or property authorized by the creator or current owner/licensee of the original property that uses at least a portion of the original property. For example, if the original property is a video file, such as a movie, the derivative property may provide for an alternate ending or use one or more of the characters in the original property. In other example, in which the original property is an audio file, such as a song, the derivative property may use a portion of the original property (commonly referred to as a "sample") or change the key(s) in which the song is performed, the instruments used to perform the song or the like.

In specific embodiments of the invention, the distributed trust computing network that stores the NFT distributed ledger includes a distributed database that stores smart contracts. In addition to having smart contracts executable on the "trunk" of the distributed ledger (i.e., the portion of the distributed ledger storing the original NFT), the present invention provides for additional smart contract that are executable on a corresponding distributed ledger branch. Such branch-specific smart contracts define the parameters for creating the derivation of the original digital property file. The parameters indicate what portion(s) of the underlying original property can be used and/or how the portion(s) can be used. In other specific embodiments of the invention, in response to accessing the NFT stored on the distributed ledger branch and consuming (i.e., viewing, listening to, or otherwise using) the derivative property, the smart contract may be configured to determine resource compensation for the current owner/licensee of the original property. In response to determination of the resource compensation, the distributed trust computing network is configured to verify the resource compensation and create a data block that includes the resource compensation, which is added to the "trunk" of the distributed ledger (i.e., the portion of the distributed ledger storing the original NFT).

In other embodiments of the invention, each distributed ledger branch defines one or more first NFT access credentials configured to be presented by creators of the derivative property for accessing the distributed ledger and the original NFT stored thereon and second NFT access credentials configured to be presented by consumers/users of the derivative property for accessing a corresponding distributed ledger branch and the second NFT stored in the corresponding distributed ledger branch.

In other embodiments of the invention, sub-branching is provided for, whereby so-called sub-branches of the distributed ledger are created from any data block of an existing branch of the distributed ledger. Each sub-branch of the distributed ledger stores an NFT formed from a derivative of the derivative digital property (i.e., a derivative of the derivative) stored on the branch of distributed ledger from which the sub-branch is created. In specific such embodiments of the invention, additional smart contracts are stored in the distributed database that are executable on a corresponding distributed ledger sub-branch. These additional smart contracts define parameters for creating the subsequent derivation used to generate NFT stored on the corresponding distributed ledger sub-branch. Moreover, in response to accessing the NFT stored on the distributed ledger sub-branch and consuming (i.e., viewing, listening to, or otherwise using) the so-called "derivative of the derivative" property, these additional smart contracts may be configured to determine resource compensation for the current owner/licensee of the original property, as well as the current owner/licensee of the derivative property. In response to determination of the resource compensation(s), the distributed trust computing network is configured to verify the resource compensation(s) and create data block(s) that includes the resource compensation, which is added to the "trunk" of the distributed ledger (i.e., the portion of the distributed ledger storing the original NFT) and/or the branch of the distributed ledger storing the derivative NFT.

A system for storing and authenticating derivative digital properties defines first embodiments of the invention. The system includes a computing platform having a first memory and one or more first computing processor devices in communication with the first memory. The first memory stores a non-fungible token generator that is configured to receive an original digital property file created by a first user and generate a first non-fungible token (NFT) from the original digital property file. The system additionally includes a distributed trust computing network that includes a plurality of decentralized nodes. Each decentralized node has a second memory and at least one second processing device in communication with the second memory. The second memory of the decentralized nodes is configured to store a distributed ledger comprising one or more data blocks having data that is authenticated by consensus of a plurality of the decentralized nodes and including a first data block that stores the first NFT. Additionally, the decentralized nodes are configured to store at least one distributed ledger branch comprising one or more branching data blocks. Each distributed ledger branch is configured to branch off from any data block of the one or more data blocks of the distributed ledger. The one or more branching data blocks includes a branching data block that stores a second NFT generated from a derivation of the original digital property file.

In specific embodiments of the system, the distributed trust computing network further includes a distributed database that stores one or more first smart contracts. Each first smart contract is executable on a corresponding one of the at least one distributed ledger branches and defines parameters for creating the derivation of the original digital property file. In such embodiments of the system, in response to accessing the second NFT stored on the branching data block and consuming the derivation of the original digital property file, the first smart contract is further configured to determine a first resource compensation associated with the consumption of the derivation of the original digital property file. In further related embodiments of the system, in response to the first smart contract determining the first resource compensation, the distributed trust computing network is further configured to generate a data block within the distributed ledger that serves to verify and record the first resource compensation.

In other specific embodiments of the system, each distributed ledger branch defines one or more first NFT access credentials configured to be presented by creators of the derivation of the original digital property file for accessing the distributed ledger and the first NFT stored in the distributed ledger. In related embodiments of the system, each distributed ledger branch defines one or more second NFT access credentials configured to be presented by consumers of the derivation of the original digital property for accessing a corresponding distributed ledger branch and the second NFT stored in the corresponding distributed ledger branch.

In further specific embodiments of the system, the second memory of the decentralized nodes is further configured to store at least one distributed ledger sub-branch that includes one or more sub-branching data blocks. Each distributed ledger sub-branch is configured to branch off from any branching data block of the one or more branching data blocks of any of the at least one distributed ledger branches. The one or more sub-branching data blocks include a sub-branching data block that stores a third NFT generated from a subsequent derivation of the derivation of the original digital property file (i.e., a derivation of the derivation). In such embodiments of the system, the distributed database further stores one or more second smart contracts. Each second smart contract is executable on a corresponding one of the at least one distributed ledger sub-branches and define parameters for creating the subsequent derivation that generated the third NFT stored on the corresponding distributed ledger sub-branch. In further such embodiments of the system, in response to accessing the third NFT stored on the sub-branching data block and consuming the subsequent derivation, the second smart contract is further configured to determine a second resource compensation associated with the consumption of the subsequent derivation and, in response to the second smart contract determining the second resource the distributed trust computing network is further configured to generate a data block within the distributed ledger that serves to verify and record the second resource compensation.

A computer-implemented method for storing and authenticating derivative digital properties. The method is executed by one or more computing processor devices, The method includes receiving an original digital property file created by a first user and generating a first non-fungible token (NFT) from the original digital property file. The method additionally includes storing a distributed ledger within memory of a plurality of decentralized nodes of a distributed trust computing network. The distributed ledger comprises one or more data blocks that store data that is authenticated by consensus of two or more of the decentralized nodes. The data blocks include a first data block that stores the first NFT. Further, the method includes generating at least one distributed ledger branch, each branch including one or more branching data blocks that store data authenticated by a consensus of two or more of the decentralized nodes. Each distributed ledger branch is configured to branch off from any data block of the one or more data blocks of the distributed ledger. The one or more branching data blocks includes a branching data block that stores a second NFT generated from a derivation of the original digital property file.

In specific embodiments the computer-implemented method further includes storing one or more first smart contracts in a distributed database of the distributed trust computing network. Each first smart contract is executable on a corresponding one of the at least one distributed ledger branches and defines parameters for creating the derivation of the original digital property file that generated the second NFT stored on the corresponding distributed ledger branch. In related embodiments the computer-implemented method further includes, in response to accessing the second NFT stored on the branching data block and consuming the derivation of the original digital property file, executing the first smart contract on the branching data block to determine a first resource compensation associated with the consumption of the derivation of the original digital property file. In still further related embodiments, the computer-implemented method includes, in response to the first smart contract determining the first resource compensation, generating a data block within the distributed ledger that serves to verify and record the first resource compensation.

In other specific embodiments of the computer-implemented method, generating the at least one distributed ledger branch further includes generating the at least one distributed ledger branch, wherein each distributed ledger branch defines (i) one or more first NFT access credentials configured to be presented by creators of the derivation of the original digital property file for accessing the distributed ledger and the first NFT stored in the distributed ledger, and (ii) one or more second NFT access credentials configured to be presented by consumers of the derivation of the original digital property for accessing a corresponding distributed ledger branch and the second NFT stored in the corresponding distributed ledger branch.

In other specific embodiments the computer-implemented method further includes generating at least one distributed ledger sub-branch comprising one or more sub-branching data blocks. Each distributed ledger sub-branch configured to branch off from any branching data block of the one or more branching data blocks of any one of the at least one distributed ledger branches. The one or more sub-branching data blocks includes a sub-branching data block that stores a third NFT generated from a derivation of the derivation of the original digital property file.

A computer program product including a non-transitory computer-readable medium defines third embodiments of the invention. The computer-readable medium includes sets of codes for causing one or more computing processing devices to receive an original digital property file created by a first user and generate a first non-fungible token (NFT) from the original digital property file. The computer-readable medium further includes a set of codes for causing one or more computing processing devices to store a distributed ledger within memory of a plurality of decentralized nodes of a distributed trust computing network. The distributed ledger comprises one or more data blocks including a data block that stores the first NFT. In addition, the computer-readable medium further includes a set of codes for causing one or more computing processing devices to generate at least one distributed ledger branch comprising one or more branching data blocks. Each distributed ledger branch configured to branch off from any data block of the one or more data blocks of the distributed ledger. The one or more branching data blocks includes a branching data block that stores a second NFT generated from a derivation of the original digital property file.

In specific embodiments of the computer program product, the computer-readable medium further comprises a set of codes for causing the one or more computing processing devices to store one or more first smart contracts in a distributed database of the distributed trust computing network. Each first smart contract is executable on a corresponding one of the at least one distributed ledger branches and defines parameters for creating the derivation of the original digital property file that generated the second NFT stored on the corresponding distributed ledger branch. In related embodiments of the computer program product, the computer-readable medium further includes a set of codes for causing the one or more computing processing devices to, in response to accessing the second NFT stored on the branching data block and consuming the derivation of the original digital property file, execute the first smart contract on the branching data block to determine a first resource compensation associated with the consumption of the derivation of the original digital property file. In further related embodiments of the computer program product, the computer-readable medium further includes a set of codes for causing the one or more computing processing devices to, in response to the first smart contract determining the first resource compensation, generate a data block within the distributed ledger that serves to verify and record the first resource compensation.

In additional specific embodiments of the computer program product, the set of codes for causing the one or more computing processor devices to generate the at least one distributed ledger branch further cause the one or more computing processor devices to generate the at least one distributed ledger branch, wherein each distributed ledger branch defines (i) one or more first NFT access credentials configured to be presented by creators of the derivation of the original digital property file for accessing the distributed ledger and the first NFT stored in the distributed ledger, and (ii) one or more second NFT access credentials configured to be presented by consumers of the derivation of the original digital property for accessing a corresponding distributed ledger branch and the second NFT stored in the corresponding distributed ledger branch.

Thus, according to embodiments of the invention, which will be discussed in greater detail below, the present invention provides for creation and secure storage of non-fungible tokens (NFT) formed from derivatives of digital properties/assets within a branch of a distributed ledger that stores the original NFT. Each branch of the distributed ledger emanates from a data block of the trunk of the distributed ledger and stores an NFT formed from a derivative of the underlying digital property used to form the original NFT stored on the trunk of the distributed ledger. Each NFT formed from the derivative of the digital property may include a smart contract that defines the parameters for the derivative and logic for determining resource compensation for the creator/owner of the original digital property/asset based on consumption of the derivative digital property/asset. Moreover, sub-branches may emanate from data blocks of the branches of the distributed ledger, with the sub-branches storing an NFT formed from a derivative of the derivative digital property/asset.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
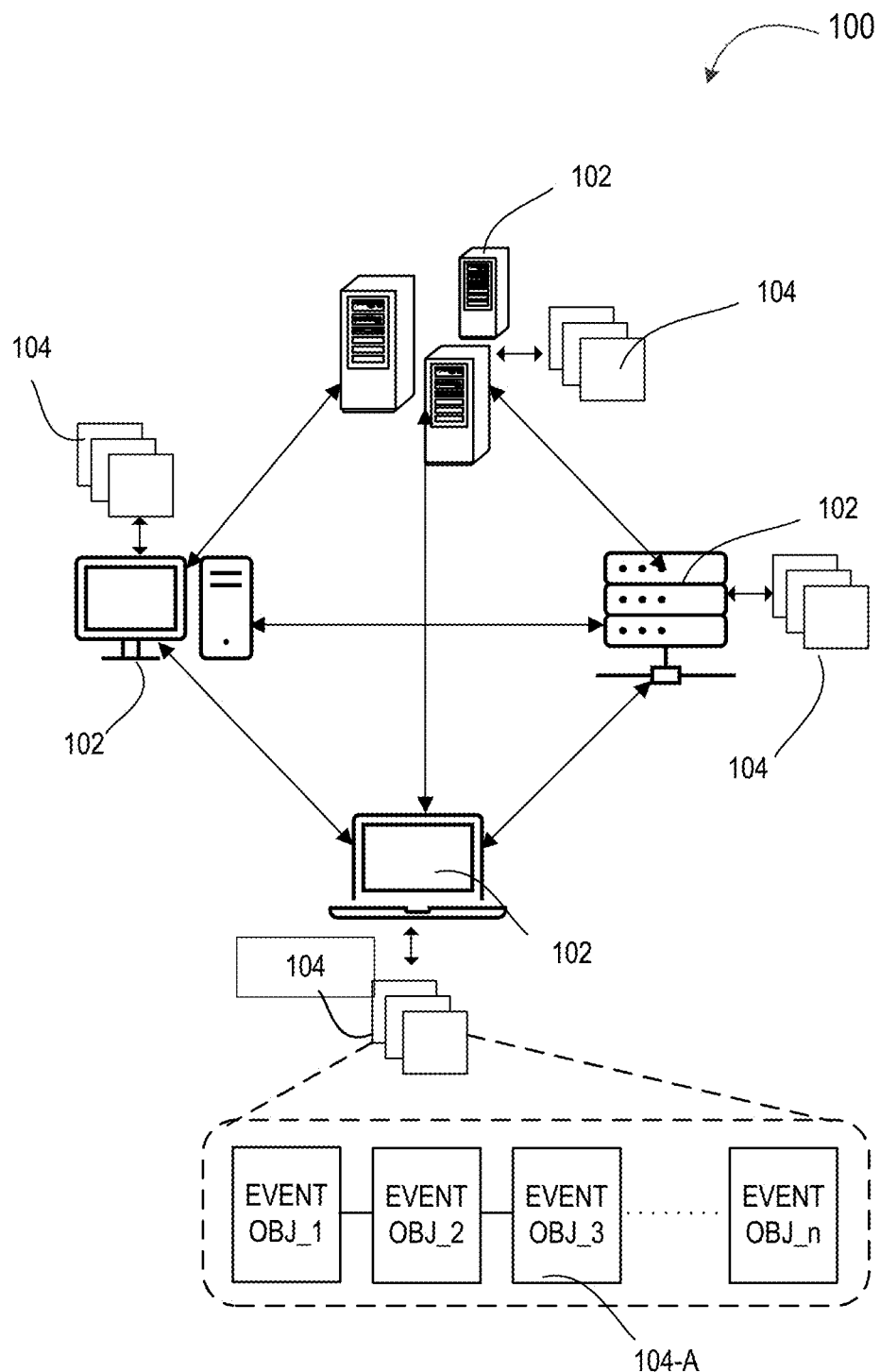
Figure 2:
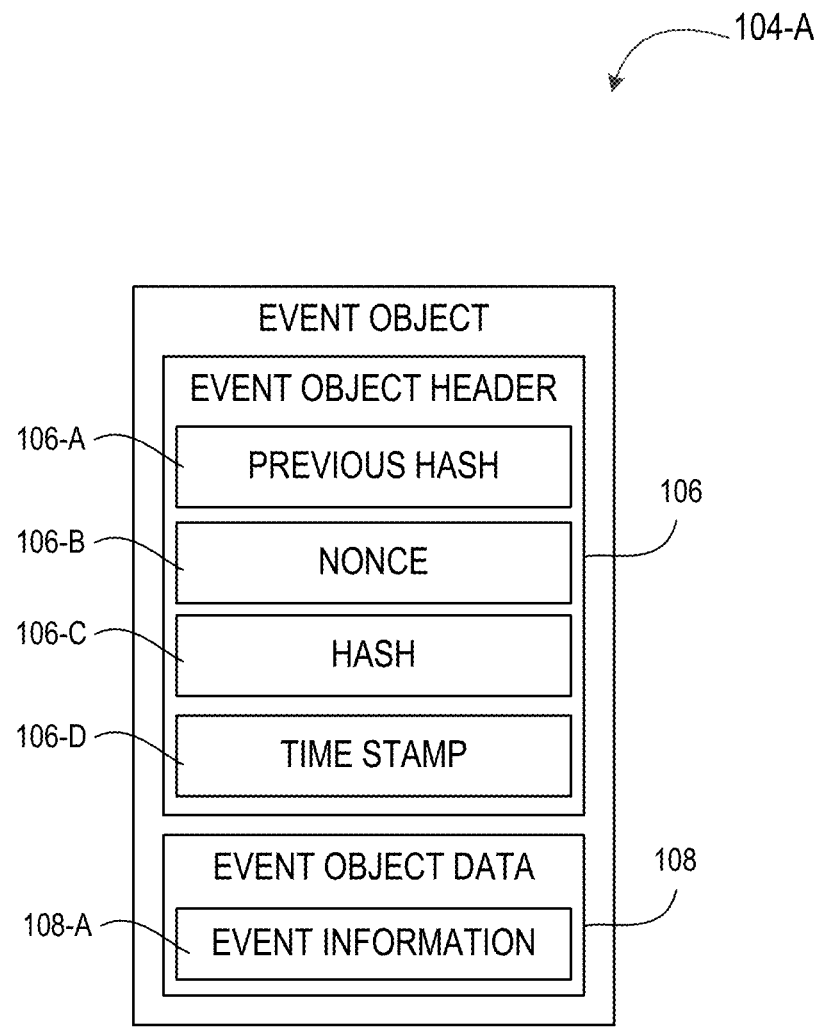
Figure 3:
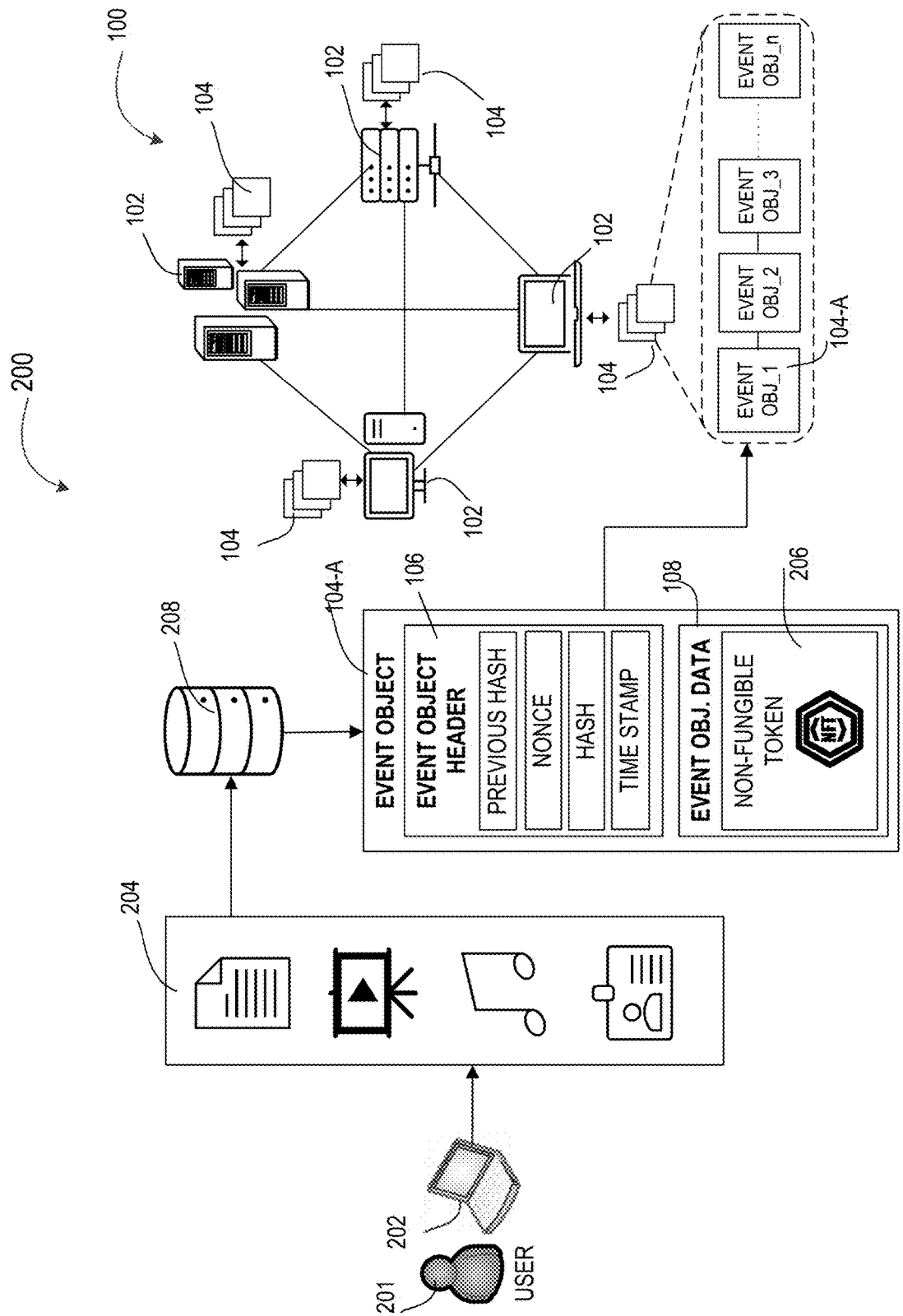
Figure 4:
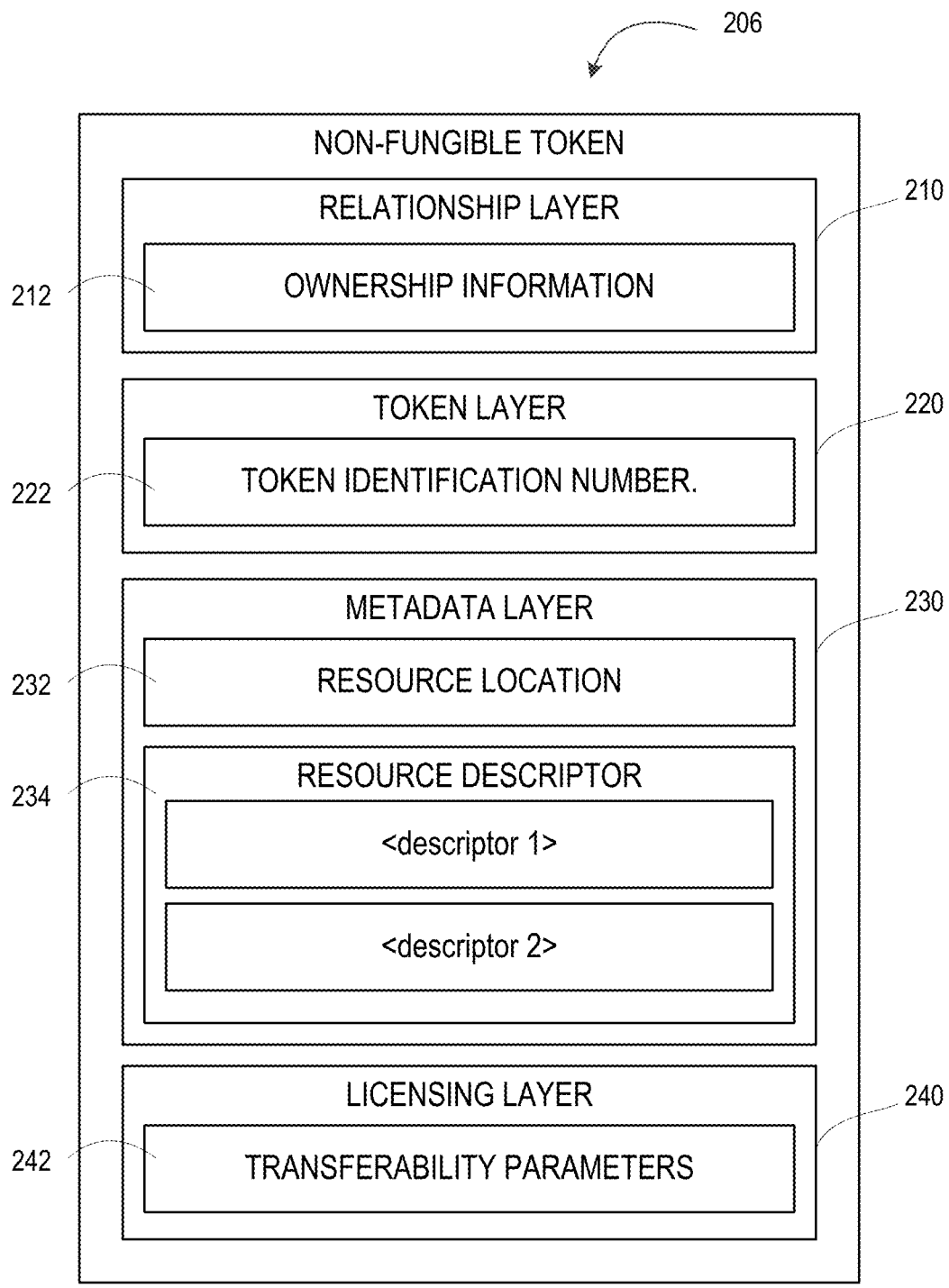
Figure 5:
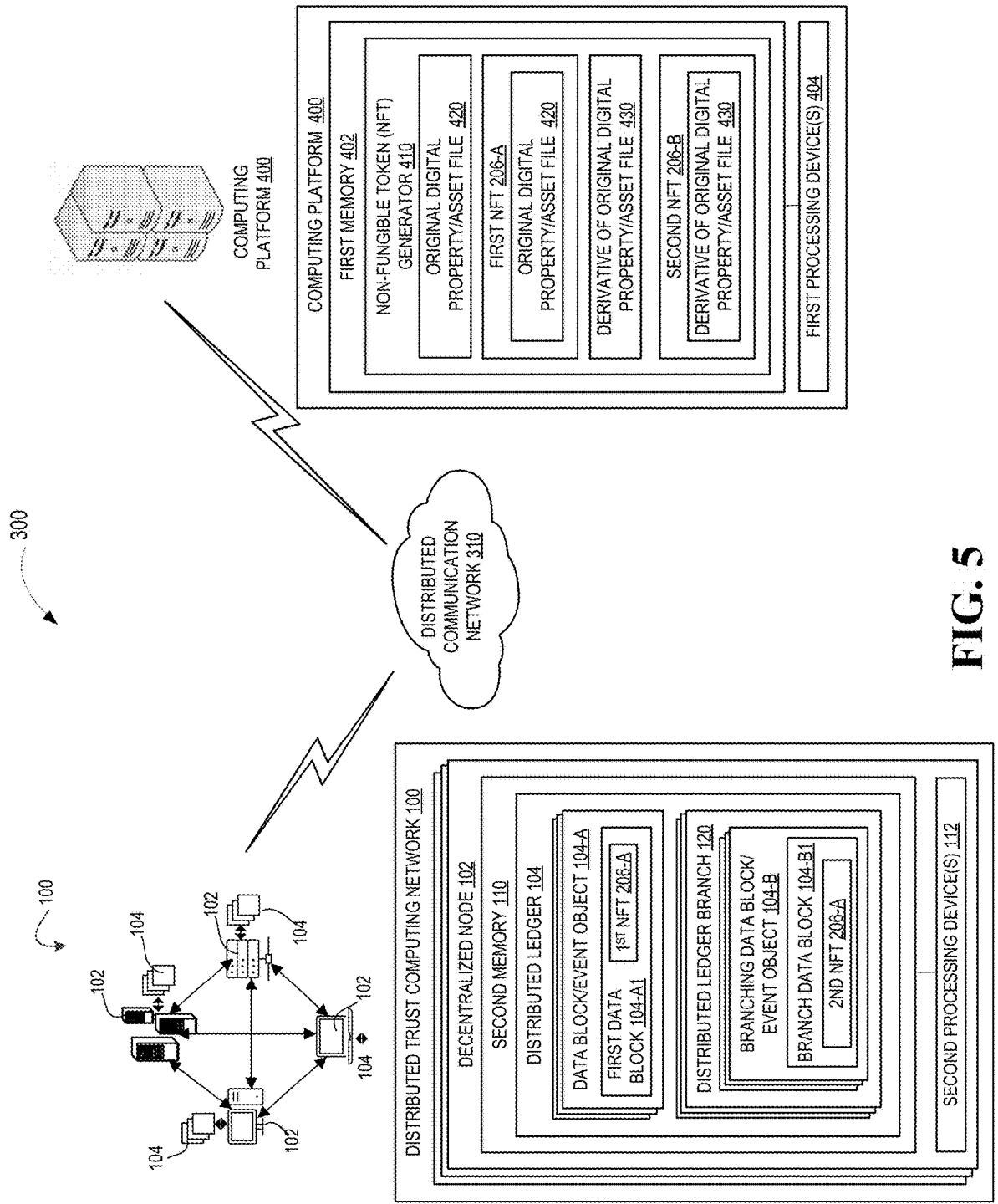
Figure 6:
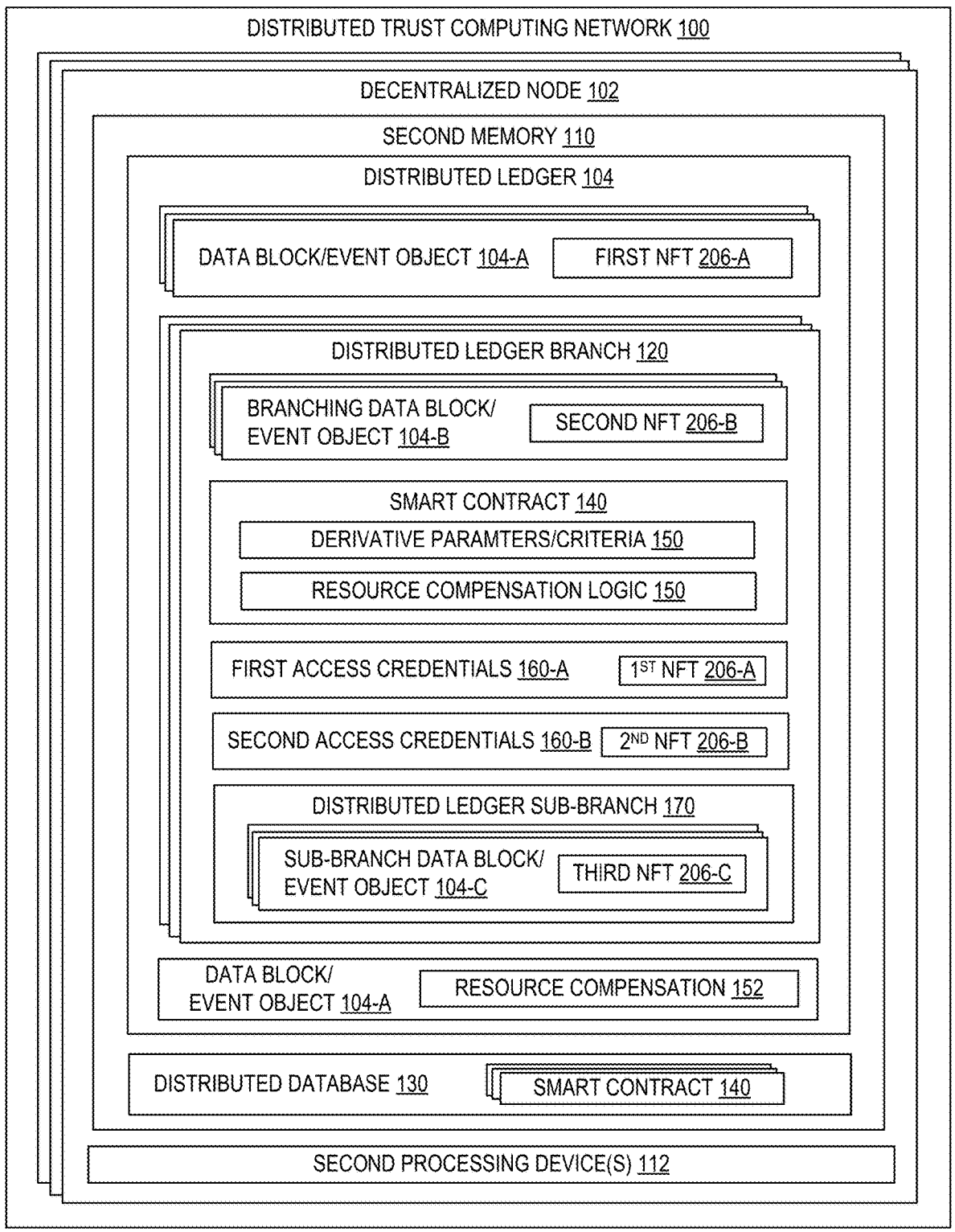
Figure 7:
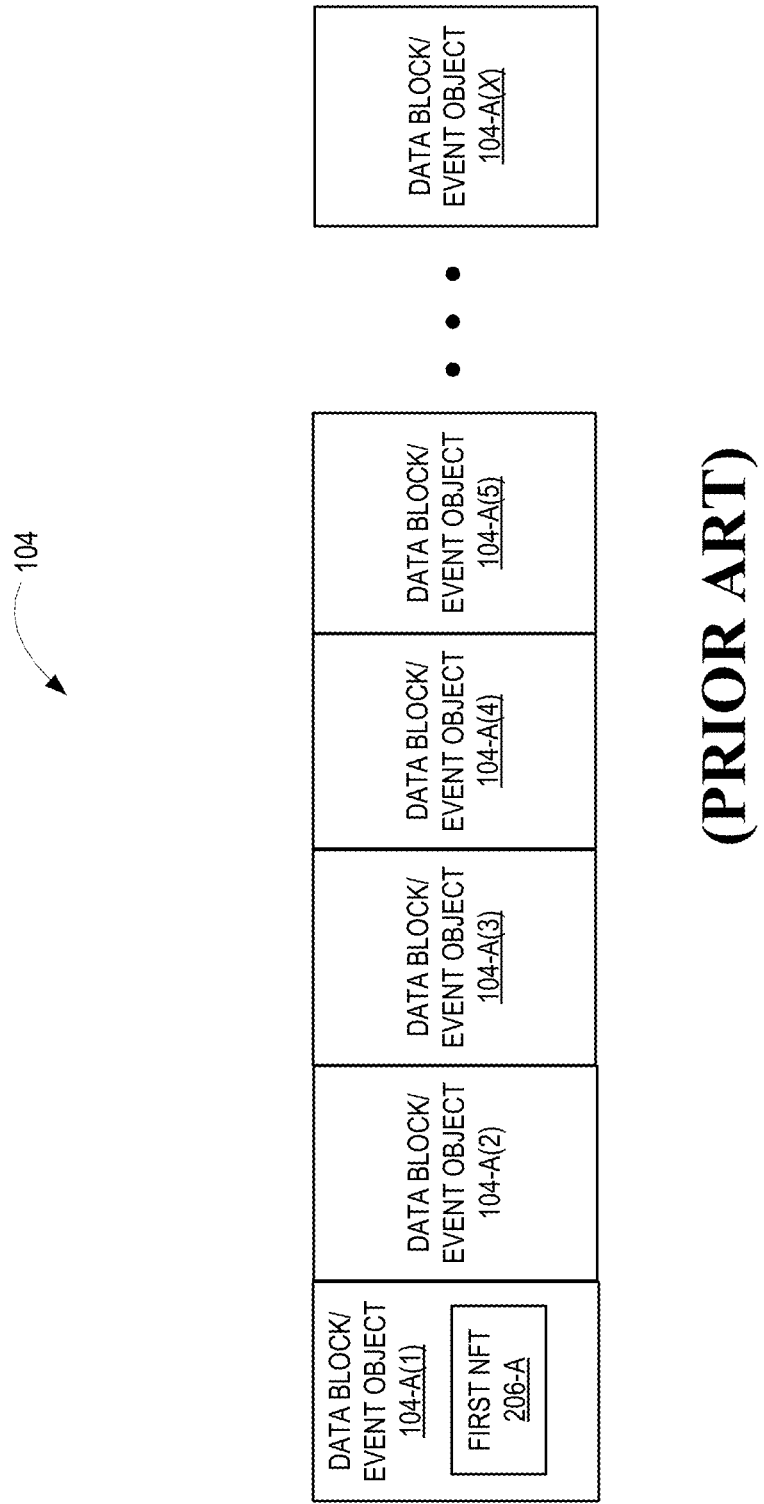
Figure 8A:
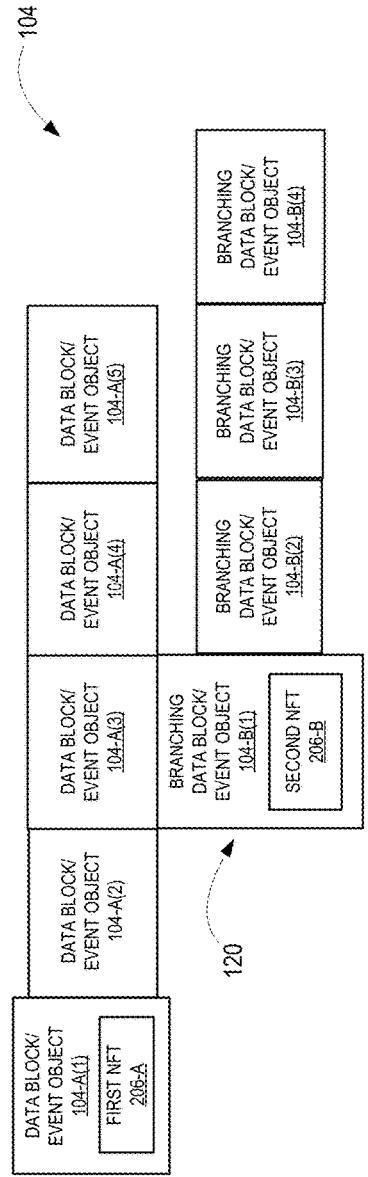
Figure 8B:
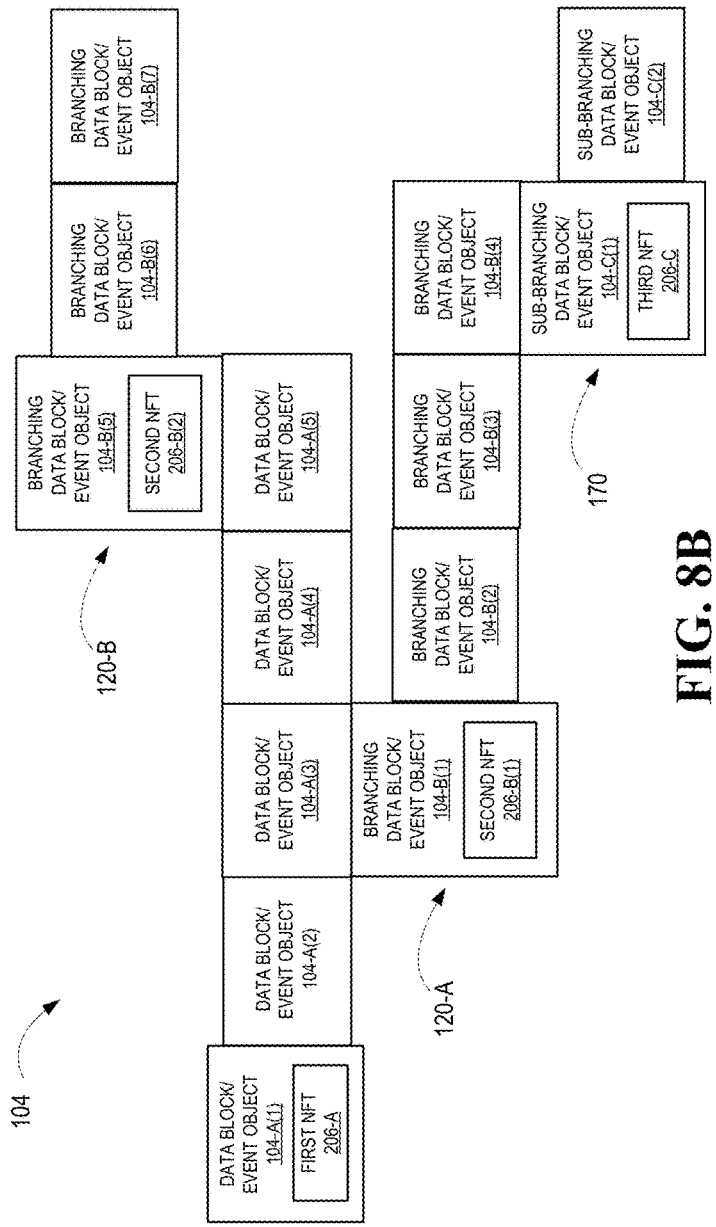
Figure 9:
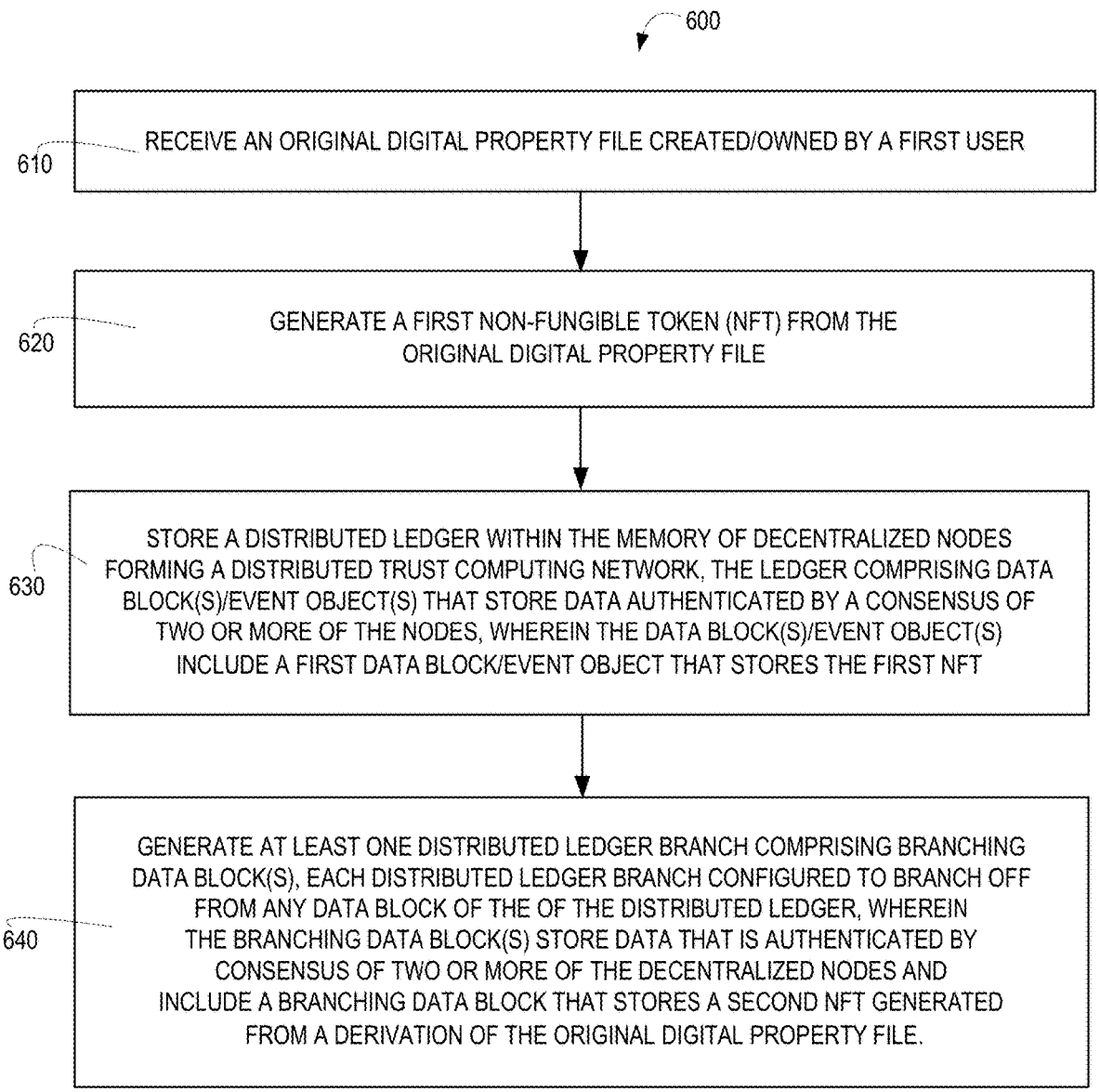

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a block diagram of an event object stored within a distributed ledger of a distributed trust computing network, in accordance with some embodiments of the present disclosure;

FIG. 3 is a schematic diagram of system for generating a Non-Fungible Token (NFT) and storing the NFT within a distributed trust computing network, in accordance with embodiments of the present invention;

FIG. 4 is a block diagram of an architecture for an exemplary NFT, in accordance with embodiments of the present invention;

FIG. 5 is schematic/block diagram if a system for generating and storing non-fungible tokens (NFT) formed from derivatives of digital properties within a branch of a distributed ledger that stores the original NFT, in accordance with embodiments of the present invention;

FIG. 6 is a block diagram of a distributed trust computing network having a distributed ledger with one or more distributed ledger branches having property/asset derivative-based NFTs stored thereon, in accordance with embodiments of the present invention;

FIG. 7 is schematic diagram of a conventional distributed ledgers, in accordance with the prior art;

FIGS. 8A and 8B are schematic diagrams of examples of distributed ledgers having distributed ledger branches with property/asset derivative-based NFTs stored thereon, in accordance with embodiments of the present invention; and FIG. 9 is a block diagram of a method for generating and storing non-fungible tokens (NFT) formed from derivatives of digital properties within a branch of a distributed ledger that stores the original NFT, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for creation and secure storage of non-fungible tokens (NFT) formed from derivatives of digital properties within a branch of a distributed ledger that stores the original NFT. The concept of branching within a distributed ledger provides for creation of a so-called "branch" to be formed from any data block within an existing distributed ledger. In this regard, multiple branches may emanate from any one data block or different data blocks within the distributed ledger. In accordance with the present invention, each branch of the distributed ledger stores an NFT formed from a derivative of the underlying digital property used to form the original NFT stored on the so-called "trunk" of the distributed ledger. A derivative of the digital property includes any work or property authorized by the creator or current owner/licensee of the original property that uses at least a portion of the original property. For example, if the original property is a video file, such as a movie, the derivative property may provide for an alternate ending or use one or more of the characters in the original property. In other example, in which the original property is an audio file, such as a song, the derivative property may use a portion of the original property (commonly referred to as a "sample") or change the key(s) in which the song is performed, the instruments used to perform the song or the like.

In specific embodiments of the invention, the distributed trust computing network that stores the NFT distributed ledger includes a distributed database that stores smart contracts. In addition to having smart contracts executable on the "trunk" of the distributed ledger (i.e., the portion of the distributed ledger storing the original NFT), the present invention provides for additional smart contract that are executable on a corresponding distributed ledger branch. Such branch-specific smart contracts define the parameters for creating the derivation of the original digital property file. The parameters indicate what portion(s) of the underlying original property can be used and/or how the portion(s) can be used. In other specific embodiments of the invention, in response to accessing the NFT stored on the distributed ledger branch and consuming (i.e., viewing, listening to, or otherwise using) the derivative property, the smart contract may be configured to determine resource compensation for the current owner/licensee of the original property. In response to determination of the resource compensation, the distributed trust computing network is configured to verify the resource compensation and create a data block that includes the resource compensation, which is added to the "trunk" of the distributed ledger (i.e., the portion of the distributed ledger storing the original NFT).

In other embodiments of the invention, each distributed ledger branch defines one or more first NFT access credentials configured to be presented by creators of the derivative property for accessing the distributed ledger and the original NFT stored thereon and second NFT access credentials configured to be presented by consumers/users of the derivative property for accessing a corresponding distributed ledger branch and the second NFT stored in the corresponding distributed ledger branch.

In other embodiments of the invention, sub-branching is provided for, whereby so-called sub-branches of the distributed ledger are created from any data block of an existing branch of the distributed ledger. Each sub-branch of the distributed ledger stores an NFT formed from a derivative of the derivative digital property (i.e., a derivative of the derivative) stored on the branch of distributed ledger from which the sub-branch is created. In specific such embodiments of the invention, additional smart contracts are stored in the distributed database that are executable on a corresponding distributed ledger sub-branch. These additional smart contracts define parameters for creating the subsequent derivation used to generate NFT stored on the corresponding distributed ledger sub-branch. Moreover, in response to accessing the NFT stored on the distributed ledger sub-branch and consuming (i.e., viewing, listening to, or otherwise using) the so-called "derivative of the derivative" property, these additional smart contracts may be configured to determine resource compensation for the current owner/licensee of the original property, as well as the current owner/licensee of the derivative property. In response to determination of the resource compensation(s), the distributed trust computing network is configured to verify the resource compensation(s) and create data block(s) that includes the resource compensation, which is added to the "trunk" of the distributed ledger (i.e., the portion of the distributed ledger storing the original NFT) and/or the branch of the distributed ledger storing the derivative NFT.

Turning now to the figures, FIGS. 1 and 2 illustrate an exemplary distributed ledger technology (DLT) architecture implemented in a distributed trust computing network (commonly referred to as a "blockchain" network), in accordance with some of the embodiments of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform, referred to herein as a distributed database. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code of the smart contract is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or a private (i.e., non-public and/or proprietary) distributed ledger. A public distributed ledger is a distributed ledger that any entity can access, communicate events to and expect to see them stored thereon if the nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 1, an exemplary distributed trust computing network 100 includes a distributed ledger 104 being maintained on multiple devices (nodes) 102 that are authorized to keep track of the distributed ledger 104. For example, the nodes 102 may be one or more computing devices such as a comprehensive computing system and one or more client device(s). Each node 102 in the distributed trust computing network 100 may have a complete or partial copy of the entire distributed ledger 104 or set of events and/or event objects 104-A on the distributed ledger 104. Events are initiated at a node and communicated to the various nodes in the distributed trust computing network 100. Any of the nodes 102 can validate an event, record the event to its copy of the distributed ledger 104 (referred to herein as a "data block"), and/or broadcast the event, the validation of the event (in the form of an event object) and/or other data to other nodes 102.

As shown in FIG. 2, an exemplary event object 104-A includes an event header 106 and an event object data 108. The event header 106 may include a cryptographic hash of the previous event object 106-A; a nonce 106-B, i.e., a randomly generated 32-bit whole number; a cryptographic hash of the current event object 106-C wedded to the nonce 106-B; and a time stamp 106-D. The event object data 108 may include event information 108-A being recorded. Once the event object 104-A is generated, the event information 108-A is considered signed and forever tied to its nonce 106-B and hash 106-C. Once generated, the event object 104-A is then deployed on the distributed ledger 104 as a data block. At this time, a distributed ledger address is generated for the event object 104-A, i.e., an indication of where the event object is located on the distributed ledger 104 and captured for recording purposes. Once deployed, the event information 108-A is considered recorded in the distributed ledger 104.

FIG. 3 illustrates an exemplary process of generating a Non-Fungible Token (NFT) 200, in accordance with an embodiment of the invention. One of ordinary skill in the art will readily appreciate that an NFT is a cryptographic record (referred to as a "token") that is linked to resources, such as digital properties (also referred to herein as assets or objects) or the like. An NFT is typically stored on a distributed ledger 104 of a distributed trust computing network 100. The storage of the NFT on the distributed ledger 104 means that various nodes 102 of the distributed trust computing network 100 have reached a consensus as to the ownership and validity/authenticity of the NFT, i.e., the linked data.

As shown in FIG. 3, to generate, otherwise referred to as "minting" an NFT, a user (e.g., NFT owner) may identify, using a user input device 202, resources 204 that the user wishes to mint as an NFT. Typically, the resources 204 used to generate the NFTs are digital properties that represent tangible and/or intangible objects. These resources 204 may include a piece of art, music, collectible, virtual world items, videos, interactive entertainment, real-world items such as artwork and real estate, or any other presumed valuable object. These resources 204 are then digitized into a proper format to generate the NFT 206. The NFT 206 may be a multi-layered documentation that identifies the resources 204 but also evidences various event conditions associated therewith.

To record the NFT 206 in a distributed ledger 104, an event object 104-A for the NFT 206 is created using data stored in database 208. As previously discussed in relation to FIG. 2, the event object 104-A includes an event object header 106 and an event object data 108. The event object header 106 includes a cryptographic hash of the previous event object, a nonce (i.e., a random 32-bit whole number generated when the event object is created), a cryptographic hash of the current event object wedded to the nonce, and a time stamp. The event object data 108 includes the NFT 206 being recorded. Once the event object 104-A is generated, the NFT 206 is considered signed and persistently tied to its corresponding nonce and hash. The event object 104-A is then deployed in the distributed ledger 104. At this time, a distributed ledger address is generated for the event object 104-A, i.e., an indication of where the NFT 206 is located on the distributed ledger 104 and captured for recording purposes. Once deployed, the NFT 206 is linked permanently to the corresponding hash and the distributed ledger 104, and is considered recorded in the distributed ledger 104, thus concluding the generation/minting process.

As shown in FIG. 3 and previously discussed in relation to FIG. 1, the distributed ledger 104 may be maintained on multiple devices (nodes) 102 of the distributed trust computing network 100; the multiple nodes 102 are authorized to keep track of the distributed ledger 104. For example, the multiple nodes 104 may be computing devices such as a computing system or end-point device(s). Each node 102 may have a complete or partial copy of the entire distributed ledger 104 or set of events and/or event objects on the distributed ledger 104. Events, such as the creation and recordation of a NFT 206, are initiated at a node 102 and communicated to the various nodes 102. Any of the nodes 102 can validate an event, record the event to the corresponding copy of the distributed ledger 104, and/or broadcast the event, its validation (in the form of an event object 104-A) and/or other data to other nodes 102.

FIG. 4 illustrates an exemplary NFT 206 as a multi-layered documentation of a resource 204, in accordance with an embodiment of an invention. As shown in FIG. 4, the NFT 206 may include at least relationship layer 210, a token layer 220, a metadata layer 230, and, when applicable, a licensing layer 240. The relationship layer 210 may include ownership information 212, including a map of various users that are associated with the resource and/or the NFT 206, and their relationship to one another. For example, if the NFT 206 is purchased by buyer B1 from a seller S1, the relationship between B1 and S1 as a buyer-seller is recorded in the relationship layer 210. In another example, if the NFT 206 is owned by O1 and the resource itself is stored in a storage facility by storage provider SP1, then the relationship between O1 and SP1 as owner-file storage provider is recorded in the relationship layer 210. The token layer 220 may include a token identification number 222 that is used to identify the NFT 206. The metadata layer 230 may include at least a file location 232 and a file descriptor 234. The file location 232 provides information associated with the specific location of the resource 204. Depending on the conditions listed in the smart contract underlying the distributed ledger 104, the resource 204 may be stored on-chain, i.e., directly on the distributed ledger 104 along with the NFT 206, or off-chain, i.e., in an external storage location. The file location 232 identifies where the resource 204 is stored. The file descriptor 234 includes specific information associated with the source itself. For example, the file descriptor 234 may include information about the supply, authenticity, lineage, provenance of the resource 204. The licensing layer 240 may include any transferability parameters 242 associated with the NFT 206, such as restrictions and licensing rules associated with purchase, sale, and any other types of transfer of the resource 204 and/or the NFT 206 from one person to another. Those skilled in the art will appreciate that various additional layers and combinations of layers can be configured as needed without departing from the scope and spirit of the invention.

Referring to FIG. 5, a schematic/block diagram is presented of a system 100 for generating, authenticating and securely storing derivative digital properties, in accordance with embodiments of the invention. The system 300 is implemented within a distributed communication network 310, which may include the Internet, one or more intranets, one or more cellular networks or the like. The system 300 includes a computing platform 400 which may comprise network-based component(s), such as application servers or the like. Computing platform 400 includes first memory 402 and one or more first computing processing devices 404 in communication with memory 402. Memory 402 stores non-fungible token (NFT) generator 410, which is executable by at least one of the one or more computing processor devices 404.

NFT generator 200 is configured to receive original digital property/asset file 420 and, in response, apply one or more cryptographic algorithms to original digital property/asset file 420 to generate first NFT 206-A. Further, NFT generator 410 or, in other embodiments of the system, some other NFT generator, is configured to receive a derivative of original digital property/asset file 430. The derivative or modification of the original digital property/asset file 430 provides for some type of change to the original digital property/asset file 420. For example, in those embodiments of the invention in which the original digital property/asset file is a video file, such as a movie or the like, the derivative digital property/asset file 430 may provide for use of the characters in the original digital property file, a different ending than the original digital property file or the like. In another example, in which the original digital property/asset file is a audio file, such as a song or the like, the derivative digital property/asset file 430 may provide for use of a sampled portion(s) of the original digital property file, a different melody, chorus or the like. The derivative digital property/asset file may have been authorized, such as by license, by the creator or entity holding rights in the original digital property/asset file, such that, the derivative digital property/asset file is created by someone other than the creator or entity holding rights on the original digital property/asset file. While in other embodiments of the system, the derivative digital property/asset file may be created by the creator or entity holding rights in the original digital property/asset file. In response to receiving the derivative digital property/asset file, NFT generator 410 is configured to apply one or more cryptographic algorithms to the derivative digital property/asset file 430 to generate second NFT 206-B.

System 100 additionally includes distributed trust computing network 100 having a plurality of decentralized nodes 102. Each decentralized node includes second memory 110 and one or more second computing processing devices 112 in communication with second memory 110. Second memory 110 stores a distributed ledger 104, which includes one or more data blocks/event objects 104-A that stores data that has been authenticated through consensus by two or more of the decentralized nodes 102. The data blocks/event objects 104-1 include a first data block 104-1A that stores the first NFT 206-A.

Additionally, distributed ledger 104 includes at least one distributed ledger branch 120 that includes one or more branching data blocks 104-B. Each distributed ledger branch 120 is configured to branch off from any data block 104-A in the distributed ledger 104. In this regard, one data block/event object 104-A in the distributed ledger 104 may have multiple distributed ledger branches 120 branching off therefrom or multiple data blocks/event objects 104-A in the distributed ledger may have one or more distributed ledger branches 120 branching off therefrom. The one or more branching data blocks 104-B store data that has been authenticated by consensus of two or more of the decentralized nodes 102. The one or more branching data blocks 104-B include a first branching data block 104-B1 that stores the second NFT 206-B generated from a derivation of the original digital property file 430.

Referring to a FIG. 6, a block diagram is presented of distributed trust computing network 100, in accordance with embodiments of the present invention. In addition to providing greater details of the distributed ledger 104, FIG. 6 highlights various alternate embodiments of the invention. Distributed trust computing network 100 comprises a plurality of decentralized nodes 102 embodied in multiple devices, such as servers, personal computing apparatus, such as PCs and laptops, or the like. Each decentralize node 102 includes second memory 110, which may comprise volatile and/or non-volatile memory, such as read-only and/or random-access memory (RAM and ROM), EPROM, EEPROM, flash cards, or any memory common to computing platforms). Moreover, memory 110 may comprise cloud storage, such as provided by a cloud storage service and/or a cloud connection service.

Further, each decentralized node 102 includes one or more second computing processing devices 112, which may be an application-specific integrated circuit ("ASIC"), or other chipset, logic circuit, or other data processing device. Second computing processing device(s) 112 may execute one or more application programming interface (APIs) (not shown in FIG. 6) that interface with any resident programs, such as smart contracts 140 or the like, stored in the distributed database 130 of distributed trust computing network 100 and any external programs. Second computing processing devices(s) 112 may include various processing subsystems (not shown in FIG. 6) embodied in hardware, firmware, software, and combinations thereof, that enable the functionality of decentralized nodes 102 and the operability of decentralized nodes 110 on a distributed communication network 310 (shown in FIG. 5), such as the Intranet, intranet(s), cellular network(s) and the like. For example, processing subsystems allow for initiating and maintaining communications and exchanging data with other networked devices. For the disclosed aspects, processing subsystems of decentralized nodes 110 may include any subsystem used in conjunction with smart contracts 140 and related tools, routines, sub-routines, algorithms, sub-algorithms, sub-modules thereof.

In specific embodiments of the present invention, decentralized nodes 110 additionally include a communications module (not shown in FIG. 6) embodied in hardware, firmware, software, and combinations thereof, that enables electronic communications between decentralized nodes 110 and other networks and network devices. Thus, communication module may include the requisite hardware, firmware, software and/or combinations thereof for establishing and maintaining a network communication connection with one or more devices and/or networks.

As previously discussed, second memory 110 of decentralized nodes 102 stores distributed ledger 104, which includes one or more data blocks/event objects 104-A that stores data that has been authenticated through consensus by two or more of the decentralized nodes 102. The data blocks/event objects 104-1 include a first data block 104-1A (shown in FIG. 5) that stores the first NFT 206-A.

Additionally, distributed ledger 104 includes at least one distributed ledger branch 120 that includes one or more branching data blocks 104-B. Each distributed ledger branch 120 is configured to branch off from any data block 104-A in the distributed ledger 104. A branch may be created when more than one data block/event object 104-A/104-B include the cryptographic hash of the previous data block/event object 104-A. In this regard, one data block/event object 104-A in the distributed ledger 104 may have multiple distributed ledger branches 120 branching off therefrom or multiple data blocks/event objects 104-A in the distributed ledger may have one or more distributed ledger branches 120 branching off therefrom. The one or more branching data blocks 104-B store data that has been authenticated by consensus of two or more of the decentralized nodes 102. The one or more branching data blocks 104-B include a first branching data block 104-B1 (shown in FIG. 5) that stores the second NFT 206-B generated from a derivation of the original digital property file 430.

In additional embodiments of the invention, second memory stores a distributed database 130 that includes a plurality of smart contracts 140. Specific ones of the smart contracts 140 are executable on a corresponding one of the distributed ledger branches 120 and define derivative parameters/criteria 150 for creating the derivative of the original digital file used to generate the second NFT 206-B stored thereon. Derivative parameters/criteria 150 defines what can and/or can not be used from the original digital property file in the derivative digital property file. For example, the portion of the original digital property that can be modified/altered, the type of modification/alteration and the like.

In additional embodiments of the invention, smart contracts 140 executable on the distributed ledger branches 120 include resource compensation logic 150 configured to, in response to accessing the second NFT 206-B stored in the branching data block and consuming/using the derivative digital property, determine a resource compensation 152 (e.g., licensing payment or the like) associated with consumption of the derivative original digital property file. In response to the resource consumption logic 150 determining the resource compensation 152, the distributed trust computing network is configured to authenticate the resource compensation and generate a data block/event object 104-A within the distributed ledger 104 that serves to verify and record the resource compensation 152. In this regard, the branching of the distributed ledger 104 provides for the ability to connect events associated with a branch 120 (e.g., resource compensation) back to the trunk of the distributed ledger 104 (e.g., recordation of the resource compensation within the original distributed ledger).

In additional embodiments of the invention, the distributed ledger branch 120 provides or defines first NFT access credentials configured to be presented by authorized creators of the derivative digital property file for accessing the distributed ledger 104 and, specifically, the first NFT 206-A stored thereon so that the creator of the derivative digital property file can gain access to the original digital property file during the creation of the derivative process. Additionally, in other embodiments of the invention, distributed ledger branch 120 provides or defines second NFT access credentials configured to be presented by consumers/users of the derivative digital property file for accessing a corresponding distributed ledger branch and the second NFT stored thereon and decrypting the second NFT for purposes of consuming the derivative digital property file.

In additional embodiments of the invention, the decentralized nodes 102 further store one or more distributed ledger sub-branches 170 including sub-branching data blocks/event objects 104-C. Each distributed ledger sub-branch 170 is configured to branch off from any branching data blocks/event objects 104-B of any of the distributed ledger branches 120. The sub-branching data blocks/event objects 104-C include a sub-branching data block that stores a third NFT 206-C generated from a subsequent derivative of the derivative digital property file (i.e., a so-called "derivative of the derivative"). One of ordinary skill in the art will appreciate that further levels of sub-branching may exist in the distributed ledger 104 depending upon how many levels of derivation exist for the underlying original digital property file. In specific such embodiments of the invention, the distributed database 130 further stores other smart contracts 140 applicable to the sub-branches 170. Each other smart contract 140 is executable on a corresponding one the distributed ledger sub-branches 170 and define derivative parameters/criteria 150 for creating the subsequent derivation that generate the third NFT 206-C stored on the corresponding distributed ledger sub-branch 170. In still further related embodiments, in response to accessing the third NFT 206-C stored on the sub-branching data block and consuming the subsequent derivation, the other smart contract 140 is further configured to determine a resource compensation 152 associated with the consumption of the subsequent derivation and, in response to the other smart contract 140 determining the resource the distributed trust computing network is further configured to generate a data block 104-C within the distributed ledger 104 and/or a data block 104-B within the distributed ledger branch 120 that serves to verify and record the resource compensation 152.

Referring to FIG. 7, a schematic diagram is shown of a conventional distributed ledger 104, in accordance with the prior art. Distributed ledger 104 includes multiple data blocks/event-objects 140-A(1)-104-A(X) that are sequentially created in chain-like formation, one data block 140-A after another data block 140-A. Each subsequent data block/event object 104-A including the cryptographic hash of the previous data block/event object 104-1. For example, data block/event object 104-A(2) includes the cryptographic has of data block/event object 104-A(1) and so on. In addition, the initial data block/event object 104-A(1) includes first NFT 206-A formed from the original digital property/asset file.

Referring to FIGS. 8A and 8B, schematic diagrams are shown of exemplary distributed ledgers 104 having branches and sub-branches containing NFTs formed from derivative digital property/asset files, in accordance with embodiments of the present invention. In FIG. 8A, distributed ledger 104 includes five data blocks/event-objects 140-A(1)-104-A(5) that are sequentially created in chain-like formation, one data block/event object 140-A after another data block/event 140-A. These data blocks/event objects 140-A(1)-104-A(5) form what is referred to as the "trunk" of the distributed ledger 104. The initial data block/event object 104-A(1) includes first NFT 206-A formed from the original digital property/asset file.

In addition, distributed ledger 104 includes a distributed ledger branch 120 that branches off from data block/event object 104-(A)(3) of the trunk and includes four data blocks/event-objects 140-B(1)-104-B(4) that are sequentially created in chain-like formation. The initial data block/event object 104-B(1) of the distributed ledger branch 120 includes second NFT 206-B formed from a derivative of the original digital property/asset file. It should be noted that distributed ledger branch 120 may be formed at a point in time when data block/event object 104-A(3) was the last data block/event object in the trunk of the distributed ledger 104 (i.e., data block/event objects 104-A(4) and 104-A(5) had yet to be added to the trunk of the distributed ledger 104, or, in other embodiments of the invention, distributed ledger branch 120 may be formed after data block/event object 104-A(4) or data blocks/event objects 104-A(4) and 104-A(5) have been added to the trunk of the distributed ledger 104.

In FIG. 8B, distributed ledger 104 includes five data blocks/event-objects 140-A(1)-104-A(5) that are sequentially created in chain-like formation, one data block/event object 140-A after another data block/event 140-A. These data blocks/event objects 140-A(1)-104-A(5) form what is referred to as the "trunk" of the distributed ledger 104. The initial data block/event object 104-A(1) includes first NFT 206-A formed from the original digital property/asset file.

In addition, distributed ledger 104 includes two distributed ledger branches 120-A and 120-B that branch off from respective data blocks/event objects 104-(A)(3) and 104-A(5) of the trunk and a distributed ledger sub-branch 170 that branches off from data block/event object 1040-B(4) of distributed ledger branch 120-A. Distributed ledger branch 120-A includes four data blocks/event-objects 140-B(1)-104-B(4) that are sequentially created in chain-like formation. The initial data block/event object 104-B(1) of the distributed ledger branch 120-A includes second NFT 206-B(1) formed from a derivative of the original digital property/asset file. Distributed ledger branch 120-B includes three data blocks/event-objects 140-B(5)-104-B(7) that are sequentially created in chain-like formation. The initial data block/event object 104-B(5) of the distributed ledger branch 120-B includes second NFT 206-B(2) formed from a derivative of the original digital property/asset file. Distributed ledger sub-branch 170 includes two data blocks/event-objects 140-C(1)-104-C(2) that are sequentially created in chain-like formation. The initial data block/event object 104-C(1) of the distributed ledger sub-branch 170 includes third NFT 206-C formed from a derivative of derivative of the original digital property/asset file.

Referring to FIG. 9, a flow diagram is presented of a method 300 for generating NFTs formed from derivatives of a digital property and storing the NFT on a branch of a distributed ledger, in accordance with embodiments of the present invention. At Event 310, an original digital property/asset file is received that is owned and/or created by a first user. For example, the digital property/asset file may comprise a musical work, a literary work, an entertainment/amusement work, a video/movie work, an image/art work or the like. At Event 320, a first non-fungible token (NFT) is generated from the original digital property/asset file, such that the original digital property/asset file is used as a seed for one or more hash algorithms to generate the first NFT.

At Event 530, a distributed ledger is stored within the memory of decentralized nodes forming a distributed trust computing network. The distributed ledger includes data blocks/event objects that store data which has been authenticated by a consensus of a plurality of the decentralized nodes. The data blocks/event objects includes a first data block/event object that stores the first NFT. The distributed ledger serves as the trunk.

At Event 540, at least one distributed ledger branch is generated, each branch including one or more branching data blocks/event objects and configured to branch off from any data block/event object of the distributed ledger/trunk. The branching data blocks store data which has been authenticated by a consensus of a plurality of the decentralized nodes. Each distributed ledger branch includes a branching data block that stores a second NFT generated from a derivative of the original digital property/asset file. The derivative of the original digital property/asset file may be created by the first user or a second user that has obtained derivative rights from the first user (i.e., owner and/or creator of the original digital property/asset file).

Thus, present embodiments of the invention discussed in detail above, provide for creation and secure storage of non-fungible tokens (NFT) formed from derivatives of digital properties/assets within a branch of a distributed ledger that stores the original NFT. Each branch of the distributed ledger emanates from a data block of the trunk of the distributed ledger and stores an NFT formed from a derivative of the underlying digital property used to form the original NFT stored on the trunk of the distributed ledger. Each NFT formed from the derivative of the digital property may include a smart contract that defines the parameters for the derivative and logic for determining resource compensation for the creator/owner of the original digital property/asset based on consumption of the derivative digital property/asset. Moreover, sub-branches may emanate from data blocks of the branches of the distributed ledger, with the sub-branches storing an NFT formed from a derivative of the derivative digital property/asset.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for storing and authenticating derivative digital properties, the system comprising:
   a computing platform including a first memory and one or more first computing processor devices in communication with the first memory, wherein the first memory stores a non-fungible token generator configured to:
     receive an original digital property file created by a first user, and
     generate a first non-fungible token (NFT) from the original digital property file;
   a distributed trust computing network comprising a plurality of decentralized nodes, each decentralized node having a second memory and at least one second processing device in communication with the second memory, wherein the second memory of the decentralized nodes is configured to store:
   a distributed ledger comprising one or more data blocks storing data that is authenticated by consensus of two or more of the decentralized nodes, wherein the one or more data blocks include a first data block that stores the first NFT, and
   at least one distributed ledger branch comprising one or more branching data blocks, each distributed ledger branch configured to branch off from any data block of the one or more data blocks of the distributed ledger, wherein the one or more branching data blocks storing data that is authenticated by consensus of two or more of the decentralized nodes and include a branching data block that stores a second NFT generated from a derivation of the original digital property file, wherein the derivation of the original digital property file comprises a modified version of the original digital property file, wherein the derivation of the original digital property file is created by a second user, and wherein each of the at least one distributed ledger branch provides for (i) one or more first NFT access credentials configured to be presented by creators of the derivation of the original digital property file for accessing the distributed ledger and the first NFT stored in the distributed ledger and (ii) one or more second NFT access credentials configured to be presented by consumers of the derivation of the original digital property for accessing a corresponding distributed ledger branch and the second NFT stored in the corresponding distributed ledger branch, wherein in response to a consumer accessing the second NFT stored on the branching data block and subsequently consuming the derivation of the original digital property file, a first smart contract is further configured to dynamically determine a first resource compensation associated with the consumption of the derivation of the original digital property file by the consumer, wherein the first resource compensation is to be distributed to the first user.

2. The system of claim 1, wherein the distributed trust computing network further comprises a distributed database that stores one or more first smart contracts, each first smart contract executable on a corresponding one of the at least one distributed ledger branch and defining parameters for creating the derivation of the original digital property file that generated the second NFT stored on the corresponding distributed ledger branch.

3. The system of claim 1, wherein in response to the first smart contract determining the first resource compensation the distributed trust computing network is further configured to generate a data block within the distributed ledger that serves to verify and record the first resource compensation.

4. The system of claim 1, wherein the second memory of the decentralized nodes is further configured to store:
at least one distributed ledger sub-branch comprising one or more sub-branching data blocks, each distributed ledger sub-branch configured to branch off from any branching data block of the one or more branching data blocks of any of the at least one distributed ledger branches, wherein the one or more sub-branching data blocks includes a sub-branching data block that stores a third NFT generated from a subsequent derivation of the derivation of the original digital property file.

5. The system of claim 4, wherein a distributed database further stores one or more second smart contracts, each second smart contract executable on a corresponding one of the at least one distributed ledger sub-branch and defining parameters for creating the subsequent derivation that generated the third NFT stored on the corresponding distributed ledger sub-branch.

6. The system of claim 5, wherein in response to accessing the third NFT stored on the sub-branching data block and consuming the subsequent derivation, the second smart contract is further configured to determine a second resource compensation associated with the consumption of the subsequent derivation and, in response to the second smart contract determining the second resource compensation the distributed trust computing network is further configured to generate a data block within the distributed ledger that serves to verify and record the second resource compensation.

7. A computer-implemented method for storing and authenticating derivative digital properties, the method executed by one or more computing processor devices and comprising:
receiving an original digital property file created by a first user;
generating a first non-fungible token (NFT) from the original digital property file;
storing a distributed ledger within memory of a plurality of decentralized nodes of a distributed trust computing network, wherein the distributed ledger comprises one or more data blocks that store data that is authenticated by consensus of two or more of the decentralized nodes, wherein the one or more data blocks include a first data block that stores the first NFT; and
generating at least one distributed ledger branch comprising one or more branching data blocks, each distributed ledger branch configured to branch off from any data block of the one or more data blocks of the distributed ledger, wherein the one or more branching data blocks store data that is authenticated by consensus of two or more of the decentralized nodes and include a branching data block that stores a second NFT generated from a derivation of the original digital property file, wherein the derivation of the original digital property file comprises a modified version of the original digital property file, wherein the derivation of the original digital property file is created by a second user, and wherein each of the at least one distributed ledger branch provides for (i) one or more first NFT access credentials configured to be presented by creators of the derivation of the original digital property file for accessing the distributed ledger and the first NFT stored in the distributed ledger and (ii) one or more second NFT access credentials configured to be presented by consumers of the derivation of the original digital property for accessing a corresponding distributed ledger branch and the second NFT stored in the corresponding distributed ledger branch and wherein in response to a consumer accessing the second NFT stored on the branching data block and subsequently consuming the derivation of the original digital property file, a first smart contract is further configured to dynamically determine a first resource compensation associated with the consumption of the derivation of the original digital property file by the consumer, wherein the first resource compensation is to be distributed to the first user.

8. The computer-implemented method of claim 7, further comprising:
storing one or more first smart contracts in a distributed database of the distributed trust computing network, each first smart contract executable on a corresponding one of the at least one distributed ledger branch and defining parameters for creating the derivation of the original digital property file that generated the second NFT stored on the corresponding distributed ledger branch.

9. The computer-implemented method of claim 7, further comprising:
in response to the first smart contract determining the first resource compensation, generating a data block within the distributed ledger that serves to verify and record the first resource compensation.

10. The computer-implemented method of claim 7, further comprising:
generating at least one distributed ledger sub-branch comprising one or more sub-branching data blocks, each distributed ledger sub-branch configured to branch off from any branching data block of the one or more branching data blocks of any one of the at least one distributed ledger branches, wherein the one or more sub-branching data blocks includes a sub-branching data block that stores a third NFT generated from a derivation of the derivation of the original digital property file.

11. A computer program product comprising:
a non-transitory computer-readable medium comprising sets of codes for causing one or more computing processing devices to:
receive an original digital property file created by a first user;
generate a first non-fungible token (NFT) from the original digital property file;
store a distributed ledger within memory of a plurality of decentralized nodes of a distributed trust computing network, wherein the distributed ledger comprises one or more data blocks storing data that is authenticated by consensus of two or more of the decentralized nodes and including a first data block that stores the first NFT; and
generate at least one distributed ledger branch comprising one or more branching data blocks, each distributed ledger branch configured to branch off from any data block of the one or more data blocks of the distributed ledger, wherein the one or more branching data blocks store data that is authenticated by consensus of two or more of the decentralized nodes and include a branching data block that stores a second NFT generated from a derivation of the original digital property file, wherein the derivation of the original digital property file comprises a modified version of the original digital property file, wherein the derivation of the original digital property file is created by a second user, and wherein each of the at least one distributed ledger branch provides for (i) one or more first NFT access credentials configured to be presented by creators of the derivation of the original digital property file for accessing the distributed ledger and the first NFT stored in the distributed ledger and (ii) one or more second NFT access credentials configured to be presented by consumers of the derivation of the original digital property for accessing a corresponding distributed ledger branch and the second NFT stored in the corresponding distributed ledger branch and wherein in response to a consumer accessing the second NFT stored on the branching data block and subsequently consuming the derivation of the original digital property file, a first smart contract is further configured to dynamically determine a first resource compensation associated with the consumption of the derivation of the original digital property file by the consumer, wherein the first resource compensation is to be distributed to the first user.

12. The computer program product of claim 11, wherein the computer-readable medium further comprises sets of codes for causing the one or more computing processing devices to:
store one or more first smart contracts in a distributed database of the distributed trust computing network, each first smart contract executable on a corresponding one of the at least one distributed ledger branches and defining parameters for creating the derivation of the original digital property file that generated the second NFT stored on the corresponding distributed ledger branch.

13. The computer program product of claim 11, wherein the computer-readable medium further comprises sets of codes for causing the one or more computing processing devices to:
in response to the first smart contract determining the first resource compensation, generate a data block within the distributed ledger that serves to verify and record the first resource compensation.

* * * * *